US009380458B2

(12) United States Patent
Rusek

(10) Patent No.: US 9,380,458 B2
(45) Date of Patent: Jun. 28, 2016

(54) METHOD FOR DETECTING EAVESDROPPERS IN A WIRELESS COMMUNICATION SYSTEM

(71) Applicant: Huawei Technologies Co., Ltd., Shenzhen, Guangdong (CN)

(72) Inventor: Fredrik Rusek, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 252 days.

(21) Appl. No.: 13/956,009

(22) Filed: Jul. 31, 2013

(65) Prior Publication Data
US 2015/0036516 A1 Feb. 5, 2015

(51) Int. Cl.
*H04W 12/02* (2009.01)
*H04W 24/08* (2009.01)
*H04W 12/12* (2009.01)

(52) U.S. Cl.
CPC .............. *H04W 12/02* (2013.01); *H04W 12/12* (2013.01)

(58) Field of Classification Search
CPC ............................. H04W 12/02; H04W 12/12
USPC ......................................................... 370/252
See application file for complete search history.

(56) References Cited

U.S. PATENT DOCUMENTS

| | | | |
|---|---|---|---|
| 6,507,012 B1 * | 1/2003 | Medard et al. | 250/225 |
| 8,498,637 B1 * | 7/2013 | Lee | 455/425 |
| 2010/0275234 A1 * | 10/2010 | Kamon et al. | 725/58 |
| 2011/0207487 A1 * | 8/2011 | Yang et al. | 455/507 |
| 2012/0087419 A1 * | 4/2012 | Khojastepour et al. | 375/259 |

OTHER PUBLICATIONS

Zhou et al., "Pilot Contamination for Active Eavesdropping," *IEEE Transactions On Wireless Communications*, Mar. 2012, vol. 11, No. 3, pp. 903-907, IEEE, New York, New York.
Rusek et al., "Scaling Up MIMO," *IEEE Signal Processing Magazine*, Jan. 2013, pp. 40-60, IEEE, New York, New York.

* cited by examiner

*Primary Examiner* — Peter Cheng
*Assistant Examiner* — Ellen A Kirillova
(74) *Attorney, Agent, or Firm* — Leydig, Voit & Mayer, Ltd.

(57) ABSTRACT

The present invention relates to a method in a wireless communication system for determining whether an active eavesdropper is interfering in transmissions on a radio channel from a transmitter to a receiver, the method comprising the steps of: estimating, by said transmitter, a first effective channel gain of said radio channel at said receiver; estimating, by said receiver, a second effective channel gain of said radio channel at said receiver; and determining whether an active eavesdropper is interfering in the transmissions by comparing said first and second effective channel gains. Furthermore, the invention also relates to a method in a receiver, a receiver device, a computer program, and a computer program product thereof.

21 Claims, 1 Drawing Sheet

METHOD FOR DETECTING EAVESDROPPERS IN A WIRELESS COMMUNICATION SYSTEM

TECHNICAL FIELD

The present invention relates to a method in a wireless communication system for determining whether an active eavesdropper is interfering or not in transmissions between a transmitter and a receiver. Furthermore, the invention also relates to a method in a receiver, a receiver device, a computer program, and a computer program product thereof.

BACKGROUND OF THE INVENTION

In traditional crypto systems, each user is assigned a secret key, and then e.g. a Base Station (BS) encrypts the messages to the mobile users so that only the user with the correct key can decrypt and recover the original message. This system can be made secure, but suffers from the problem of key distribution. The distribution is both costly and unreliable. If there is an eavesdropper that somehow manages to steal the key of some user, then the communication to that user is totally un-protected. In the modern world, and in simulated wars, the main strategy to break a crypto system is to steal the key as there cannot be any "mathematical protection" against person B stealing person A's key. Further, distributing keys to, literally speaking, millions of customers are not easy tasks and impose significant economical overheads and costs.

An alternative to key-based crypto systems is Physical Layer Security (PLS). In PLS, one exploits the fact that the user (the reader can view a "user" as e.g. a mobile station or a UE in 3GPP LTE system) and the eavesdropper (an enemy that tries to overhear the transmission) have different communication channels. Associated to each particular channel is its Shannon capacity. The Shannon capacity is the highest bit rate that can be transmitted over the channel without any bit errors, and the reader can think of Shannon capacity as the maximal bit rate that his/her mobile phone can operate with at any given time. This Shannon capacity has absolutely nothing to do with crypto systems, but the following classical results establishes a link.

Theorem of secrecy capacity (SC): Let $C_{IU}$ be the Shannon capacity to the Intended User (IU), and $C_{ED}$ to the Eavesdropper (ED). Then, without any formal cryptosystem, the bit rate $C_{SC} = C_{IU} - C_{ED}$ can be transmitted with perfect security to the intended user.

Let us exemplify this result with a simple example: Person A is walking around downtown and is downloading documents at a bit rate of 10 Mbit/s, while the channel is actually so good that A could have downloaded at a rate 25 Mbit/s (i.e. the Shannon capacity of the channel). Person A is intentionally backing off the peak rate. Now, another person B—the eavesdropper—is also downtown and can overhear the transmission to person A, and the Shannon capacity of the channel to person B is slightly worse than to person A, namely 18 Mbit/s. According to the theorem of SC, the SC is the difference of the two Shannon capacities, i.e. 25−18=7 Mbit/s. But, person A is downloading at a higher rate that the secrecy capacity, which implies that his transmission is not secure and person B can steal his data. If person A would have been careful, person A would have downloaded with a much smaller rate, say, 3 Mbit/s, and then person A's link would be safe even without any cryptosystem.

Now, the relation among the numbers in the previous example is representative for "normal" (i.e. small) MIMO, systems but for massive MIMO systems the situation changes drastically. Current multiple antenna (MIMO) systems use at most 8 antennas at the base station side. However, massive MIMO systems are actively researched and are one of the "hot areas" within the technical field. A massive MIMO system scales up the number of antennas with >1 order of magnitude, and a 1000 antenna base station are not ruled out in these scenarios. Massive MIMO is likely to become a key technology in future 5G wireless systems.

For massive MIMO, the ratio of the Shannon capacity to the eavesdropper and the Shannon capacity to the intended user will be very close to 0; closer to 0 the more antennas at the base station. This implies that the SC is almost identical to the Shannon capacity to the intended user. In our example, we would have that $C_{IU}=25$ Mbit/s, but a typical value for $C_{ED}$ with 60-80 antennas would be, say, $C_{ED}=0.5$ Mbit/s. Hence, the user's data is perfectly safe as 10<25−0.5=24.5. In fact, the user can download at rates very close the peak data rate and there is no need for any crypto system as the link is guaranteed to be safe by the mentioned Theorem of SC.

The inventor has therefore identified the neat result that a passive eavesdropper (i.e., one that just walks around and listens to the channel) cannot do any harm to the PLS of a massive MIMO system. Therefore, it has been concluded that a clever eavesdropper will change into an active mode by using a so called pilot attack. What the eavesdropper will do is simply to transmit some cleverly chosen signals with the overall effect that some of the Shannon capacity to the intended user will be "stolen", and the problem is that the intended user does not know that it is stolen, the intended user can only see that the capacity is low.

Let us continue with our example. The eavesdropper transmits a few pilot signals with the end effect is that $C_{ED}=10$ Mbit/s and $C_{IU}=15$ Mbit/s, so that $C_{SC}=5$ Mbit/s, and since the data rate is 10 Mbit/s, which exceeds the SC, the transmission is no longer safe. The problem is that the intended user only sees that intended user has $C_{IU}=15$ Mbit/s, but has no idea that $C_{ED}=10$ Mbit/s. Therefore the intended user does not know that the transmission is not safe and cannot take any countermeasures.

SUMMARY OF THE INVENTION

An object of the present invention is to provide a solution so that active eavesdroppers interfering in wireless transmissions between a transmitter and a receiver can be detected. Another object of the invention is to provide a simple solution to the above mentioned issue.

The above mentioned object are achieved by a method in a wireless communication system for determining whether an active eavesdropper is interfering in transmissions on a radio channel from a transmitter to a receiver, the method comprising the steps of:

a) estimating, by said transmitter, a first effective channel gain of said radio channel at said receiver;
b) estimating, by said receiver, a second effective channel gain of said radio channel at said receiver; and
c) determining whether an active eavesdropper is interfering in the transmissions by comparing said first and second effective channel gains.

Different preferred embodiments of the invention are defined in the appended dependent claims. The present method can also be executed in processing means and be comprised in a suitable code means.

According to another aspect of the invention the above mentioned object is achieved by a method in a receiver for determining whether an active eavesdropper is interfering in transmissions on a radio channel from a transmitter to said receiver, the method comprising the steps of:
  d) receiving a first effective channel gain of said radio channel at said receiver, said first effective channel gain being estimated by said transmitter;
  e) estimating a second effective channel gain of said radio channel; and
  f) determining whether an active eavesdropper is interfering in the transmissions by comparing said first and second effective channel gains.

The present method in a receiver can be implemented in a suitable receiver device.

With the present invention the existence of an active eavesdropper interfering in transmissions between a transmitter and a receiver can be efficiently detected. Further, the detection can be reported back to the transmitter and the additional overhead can be held small and may only be related to the number of bits in the quantization.

Further applications and advantages of the invention will be apparent from the following detailed description

DETAILED DESCRIPTION OF THE INVENTION

Figure 1:
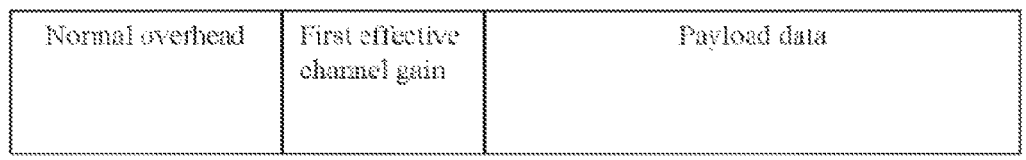
FIG. 1 illustrates a data packet according to an embodiment of the present invention.

This present invention provides a simple, yet powerful, solution to an eavesdropper's attack. It should be noted that there is absolutely nothing discussed in prior art so far in the present topic. In fact, not even the problem itself which the present invention solves has been observed for massive MIMO systems which also implies that no prior art solutions exists.

To provide a deeper understanding of the present invention the following background is provided: Assume that the wireless system using massive MIMO operates in Time Division Duplex (TDD) mode, and the training symbols are sent from the users since there are too many antennas at the transmitter, e.g. a BS, to send orthogonal training symbols from that side. Then, one relies on channel reciprocity and assumes that the downlink channel=uplink channel (possibly compensated for the hardware of the BS).

Let the channel vector from the IU to the BS be $g_{IU} = \sqrt{\beta_{IU}} h_{IU}$ where $\beta_{IU}$ is a scalar measuring the shadow fading to the IU, and $h_{IU}$ is a 1×M vector that models the small-scale fading, and M is the number of BS antennas (assumed large) in the MIMO transmissions. The channel to the BS from the ED is similarly written as $g_{ED} = \sqrt{\beta_{ED}} h_{ED}$.

The IU transmits a pilot symbol p to the BS, which receives $r = p\sqrt{\beta_{IU}} h_{IU} + n$. The receiver now estimates the channel from the IU as $g_{IU} = r/p = \sqrt{\beta_{IU}} h_{IU} + n/p$. Let us denote the variance of n/p by $N_0$.

The IU constructs a beamforming vector by taking the complex transpose of the channel estimate $$f = \frac{g_{IU}^H}{\sqrt{M} \|g_{IU}^H\|}.$$

This gives an average transmit power of 1/M.

At the IU, the effective channel will be y=αx+w, where $\alpha = g_{IU} f$. Asymptotically in M we have that $$|\alpha|^2 \to \frac{\beta_{IU}^2}{\beta_{IU} + N_0}, M \to \infty.$$

The noise density at the IU is $N_{IU}$ and is unknown to the BS.

At the same time, since $h_{IU}$ and $h_{ED}$ are independent, we have that $g_{ED} f \to 0$, $M \to \infty$ which means that the ED will not receive any power at all, and hence the SC is perfect in the sense that it equals the Shannon capacity, i.e., $$C_{SC} \to C_{IU} \to \log\left(1 + \frac{\beta_{IU}^2}{N_0(\beta_{IU} + N_0)}\right), M \to \infty$$

We therefore conclude that there is no danger to system with a passive ED as the ED cannot overhear the transmission.

We now change the operations of the ED and the ED will be active and will send pilot signals overlapping with the IU's pilot signals. This is a worst case assumption as, in reality, the ED will possibly be somewhat mismatched in time/frequency with the pilot signal sent from the IU. This will have the effect that some power will be beamformed to the ED instead of to the IU. How much the ED will get of this power will depend on the relative powers of the pilot signals from the ED and the IU. We have the following situation:

The BS receives $r = p\sqrt{\beta_{IU}} h_{IU} + \sqrt{\gamma} p \sqrt{\beta_{ED}} h_{ED} + n$.

The BS does not know whether r contains the channel to the ED or not, so the BS will estimate the channel to the IU as $g_{IU} = r/p = \sqrt{\beta_{IU}} h_{IU} + \sqrt{\gamma} \sqrt{\beta_{ED}} h_{ED} + n/p$.

The IU constructs a beamforming vector by taking the complex transpose of the channel estimate $$f = \frac{g_{IU}^H}{\sqrt{M} \|g_{IU}^H\|}.$$

This gives an average transmit power of 1/M.

The IU receives a signal $y = \alpha_{IU} x + w$ with $$|\alpha_{IU}|^2 = \frac{\beta_{IU}^2}{\beta_{IU} + \gamma \beta_{ED} + N_0}.$$

The ED receives $y = \alpha_{ED} x + w$ with $$|\alpha_{ED}|^2 = \frac{\gamma^2 \beta_{ED}^2}{\beta_{IU} + \gamma \beta_{ED} + N_0}.$$

In this case, the SNR at the ED can be larger than at the IU without that the IU or the BS knows about it. This may cause the SC to be 0.

Hence, we must develop a technique that allows the system to determine/detect whether there is an active ED present or not interfering in the transmissions. This is achieved by the present invention. The transmitter estimates a first effective channel gain of the radio channel at the receiver, i.e. the IU. The receiver (IU) estimates a second effective channel gain of the radio channel at the receiver. And finally it is determined whether an active ED is interfering in the transmissions from the transmitter to the receiver by comparing the first and second effective channel gains.

It is assumed that the active ED transmits one or more pilot signals to interfere in the mentioned transmissions. Further, the square of the first and second effective channel gains are proportional to the SNR at the receiver according to an embodiment of the invention.

The step of determining may be performed in any suitable node of the system, e.g. a central control node. The determining step may preferably comprise calculating a ratio of the first and second effective channel gains; and thereafter comparing the ratio with a threshold value so as to determine whether an active ED is interfering in the transmissions or not. It has been concluded that the ratio may be compared to a threshold value, and it is determined that an ED is present if the ratio is equal to or less than the threshold value. It should however be noted that a comparison of the difference between the first and second effective channel gains may be performed to determine if an active ED is interfering in the transmissions, e.g. Log-values of the first and second effective channel gains, etc.

The threshold value is preferably simulated and predefined, and based on the number of transmit antennas in the MIMO transmission from the transmitter, so to determine the threshold, simulation must be performed. These simulations will be specific to the number of transmit antennas M. The more antennas, the more accurate will the estimations be and the higher value for the threshold value can take.

The following disclosure gives a more detailed explanation of the different steps of an embodiment of the present invention.

Step 1: Channel Estimation

The transmitter forms a channel estimate $g_{IU}$=r/p where r is the received signal at the IU's pilot slot and p is the pilot symbol. The noise per element is $N_0$ which is for notational convenience and implies that the AWGN variance is $p^2 N_0$. We assume that the value of $N_0$ is known at the transmitter which is a mild constraint as this is long-term constant and can be estimated through standard methods. How to estimate $N_0$ is not a part of the present invention. Further, the noise density can be measured outside the transmission bandwidth so that a high quality estimate can be obtained.

Step 2: IU Effective Channel Prediction

In the case that the ED is not present, the effective channel gain at the IU will have square magnitude $$|\alpha|^2 \approx \frac{\beta_{IU}^2}{\beta_{IU} + N_0}.$$

In order to estimate this value, we must estimate $\beta_{IU}$. We can do this as we know that $$\frac{g_{IU} g_{IU}^H}{M} \rightarrow \beta_{IU} + N_0, M \rightarrow \infty.$$

Therefore, we can compute an estimate of $|\alpha|^2$ as, $$\beta_{IU} \approx \frac{g_{IU} g_{IU}^H}{M} - N_0,$$

$$[|\alpha|^2]_{EST} = \frac{\beta_{IU}^2}{\beta_{IU} + N_0} = \frac{\left(\frac{g_{IU} g_{IU}^H}{M} - N_0\right)^2}{\frac{g_{IU} g_{IU}^H}{M}}.$$

This estimated value will now be quantized and can added to the data packet in FIG. 1.

Step 3: Channel Estimation at the IU

This step needs to be done no matter if there is PLS or not. However, for the present application, the problem is simpler than the channel estimation problem as we do not need any phase information. Given that the noise density is known at the IU—and, again, noise is long term constant and can be estimated with a variety of methods (it needs to be done anyway in most systems)—then we can estimate the power of the channel gain as, $$[|\alpha|^2]_{IU-EST} = \frac{1}{N} \sum_{n=1}^{N} |y_k|^2 - N_{0, IU-EST}.$$

This is because we have the model y=αx+w, so that the expected power per sample in y becomes $|\alpha|^2 + N_{0,IU}$ (under the standard assumption of unit average energy symbols). Such estimation requires that the observation window is fairly large. In cases where the observation window is short, a dedicated training symbol can be inserted. In this case, the first symbol in v would be known, and we can assume it to be unity. Then, we can estimate the power of the channel gain according to the MMSE-criteria as, $$[|\alpha|^2]_{IU-EST} = \frac{|y_1|^2}{1 + N_{0,IU}}.$$

Step 4 and 5: Comparison with Threshold Value and Reporting

The IU now computes the ratio $$\varphi = \frac{[|\alpha|^2]_{IU-EST}}{[|\alpha|^2]_{EST}}$$

(or a difference value) and compares the ratio with a threshold value δ. If φ<δ, then the IU declares an attack and reports this to the transmitter via a feedback link, and the transmitter stops the transmissions in response to message from the IU. Otherwise, there is no attack declared and the transmission continues.

Hence, according to an embodiment of the invention, the step of determining is performed in the receiver (IU). In this respect a new protocol between the transmitter and receiver according to the invention is presented which also was mentioned in the above example. The protocol will allow the IU to identify whether there is an ED attacking the system or not. If so, the IU will inform the transmitter to stop the transmissions. FIG. 1 gives an example of a data packet according to the invention. The data packet transmitted from the transmitter to the IU may have the form as shown in FIG. 1. The only additional overhead needed is a quantized version of the estimated effective channel at the IU.

In summary, with reference to FIG. 1, the following operations need to be done according to this embodiment:

The transmitter (e.g. a BS) estimates the channel by predicting the power of the effective channel (the first effective channel gain) at the IU and encodes this information into a payload data packet.

The IU performs channel estimation at the IU and computes the power of the second effective channel gain. Note that this step is required in all systems, so that this does not bring any additional overhead to the system.

The IU compares the second estimated channel gain with the predicted first effective channel gain received from the transmitter.

If the ratio of the two gains is smaller than a pre-defined threshold, the IU declares an attack and requests the transmitter to stop the transmission via a feedback link.

Figure 2:
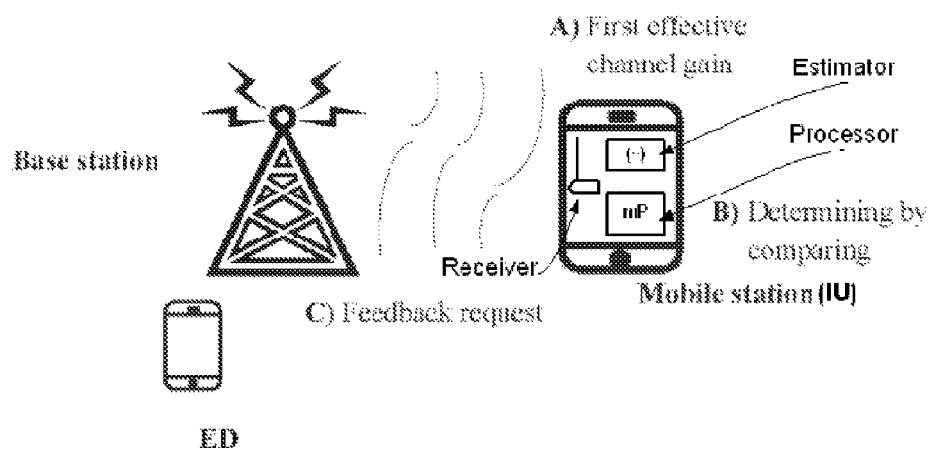
FIG. 2 is a system overview and a process flow of an embodiment of the present invention.

FIG. 2 illustrates a system overview of an embodiment of the present invention. The system is in this example a cellular wireless communication system, such as LTE or GSM. The transmissions are performed in the downlink and the uplink of the system. It should however be noted the present invention is a general method for detecting active EDs and is not limited to a particular wireless communication system. With reference to FIG. 2:

In step A, the base station transmits a first effective channel gain to the mobile station.

In step B, the mobile station compares the first effective channel gain with the second effective channel gain and determines if an ED is interrupting in the transmissions between the base station and the mobile stations.

In step C, the mobile station request a stop of transmissions if it was determined in step 2 that an ED was interrupting in the transmissions.

Furthermore, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The present method for determining whether an active eavesdropper is interfering in transmissions on a radio channel from a transmitter to a receiver will in the receiver comprise the steps of: receiving a first effective channel gain of the radio channel at the receiver, the first effective channel gain being estimated by the transmitter; estimating a second effective channel gain of the radio channel; and determining whether an active eavesdropper is interfering in the transmissions by comparing the first and second effective channel gains.

The invention also relates to a receiver device comprising the suitable means, elements, units, and being arranged to execute the above method, Mentioned means, units, elements, may e.g., be memory, processing circuitry, coupling means, antenna means, precoding unit, amplifier unit, etc. The present receiver may e.g. be a UE in the LTE system. The receiver may receive the first effective channel gain from a transmitter device of the system.

The present receiver device for determining whether an active eavesdropper is interfering in transmissions on a radio channel from a transmitter to said receiver, the device comprises: a receiving unit arranged for receiving a first effective channel gain of a radio channel at said receiver, the first effective channel gain being estimated by the transmitter; an estimating unit arranged to estimating a second effective channel gain of the radio channel; and a determining unit arranged to determining whether an active eavesdropper is interfering in the transmissions by comparing the first and second effective channel gains.

A receiver, also known as UE in LTE systems, mobile station, wireless terminal and/or mobile terminal is enabled to communicate wirelessly in a cellular wireless communication system. The receiver may further be referred to as mobile telephones, cellular telephones, computer tablets or laptops with wireless capability. The receivers in the present context may be, for example, portable, pocket-storable, hand-held, computer-comprised, or vehicle-mounted mobile devices, enabled to communicate voice and/or data, via the radio access network, with another entity.

In some radio access networks, several transmitters may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural transmitters connected thereto. In 3rd Generation Partnership Project (3GPP) Long Term Evolution (LTE), transmitters, which may be referred to as eNodeBs or eNBs, may be connected to a gateway, e.g., a radio access gateway, to one or more core networks.

Finally, it should be understood that the present invention is not limited to the embodiments described above, but also relates to and incorporates all embodiments within the scope of the appended independent claims.

What is claimed is:

1. A method in a wireless communication system for determining whether an active eavesdropper interferes in transmissions on a radio channel from a transmitter to a receiver, the method comprising:
   estimating, by the transmitter, a first effective channel gain of the radio channel at the receiver;
   estimating, by the receiver, a second effective channel gain of the radio channel at the receiver;
   obtaining, a ratio or a difference value of the first and second effective channel gains;
   determining whether the active eavesdropper interferes in the transmissions by comparing the ratio or difference value with a threshold value; and
   wherein the threshold value is simulated based on a quantity of transmit antennas in Multi-input Multi-output (MIMO) transmissions.

2. The method according to claim 1, wherein the determining is performed by the receiver.

3. The method according to claim 1, wherein the active eavesdropper interferes in the transmissions, if the ratio or difference value is less than or equal to the threshold value.

4. The method according to claim 1, wherein the transmitter employs Multi-input Multi-output (MIMO) transmissions to the receiver.

5. The method according to claim 1, wherein a representation of the first effective channel gain is encoded in a data packet transmitted to the receiver.

6. The method according to claim 5, wherein the data packet is transmitted by the transmitter.

7. The method according to claim 1, wherein the active eavesdropper transmits pilot signals so as to interfere in the transmissions.

8. The method according to claim 1, further comprising:
signaling a request to stop the transmissions based on whether the active eavesdropper interferes in the transmissions.

9. The method according to claim 8, wherein the transmitter stops the transmissions when receiving the request.

10. The method according to claim 9, wherein the request is signaled by the receiver to the transmitter.

11. The method according to claim 1, wherein the transmitter is a base station and the receiver is a mobile station in a cellular communication system.

12. The method according to claim 1, wherein a first square value of the first effective channel gain and a second square value of the second effective channel gain are proportional to the Signal-to-Noise Ratio (SNR) at the receiver.

13. A method for determining whether an active eavesdropper interferes in transmissions on a radio channel from a transmitter to a receiver, the method comprising:
receiving, by the receiver, a first effective channel gain of the radio channel at the receiver, the first effective channel gain being estimated by the transmitter;
estimating, by the receiver, a second effective channel gain of the radio channel at the receiver;
obtaining, a ratio or a difference value of the first and second effective channel gains;
determining whether the active eavesdropper interferes in the transmissions by comparing the ratio or difference value with a threshold value; and
wherein the threshold value is simulated based on a quantity of transmit antennas in Multi-input Multi-output (MIMO) transmissions.

14. The method according to claim 13, wherein the transmitter is a base station and the receiver is a mobile station in a cellular communication system.

15. The method according to claim 13, wherein the active eavesdropper interferes in the transmissions, if the ratio or difference value is less than or equal to the threshold value.

16. A receiver device arranged for communication in a wireless communication system and further arranged for determining whether an active eavesdropper interferes in transmissions on a radio channel from a transmitter to the receiver;
the receiver device comprising:
a receiver, configured to receive a first effective channel gain of a channel at the receiver device, the first effective channel gain being estimated by the transmitter;
an estimator, configured to estimate a second effective channel gain of the radio channel;
a processor, configured to:
obtain, a ratio or a difference value of the first and second effective channel gains;
determine whether the active eavesdropper interferes in the transmissions by comparing the ratio or difference value with a threshold value; and
wherein the threshold value is simulated based on a quantity of transmit antennas in Multi-input Multi-output (MIMO) transmissions.

17. The receiver according to claim 16 wherein the transmitter is a base station and the receiver is a mobile station in a cellular communication system.

18. The receiver according to claim 16, wherein the active eavesdropper interferes in the transmissions, if the ratio or difference value is less than or equal to the threshold value.

19. A non-transitory computer readable medium having computer executable instructions which when executed by a computer processor causes the computer processor to execute the following:
receiving a first effective channel gain of a radio channel at a receiver device, the first effective channel gain being estimated by a transmitter;
estimating, at the receiver device, a second effective channel gain of the radio channel; and
obtaining, a ratio or a difference value of the first and second effective channel gains;
determining whether an active eavesdropper interferes in the transmissions by comparing the ratio or difference value with a threshold value; and
wherein the threshold value is simulated based on a quantity of transmit antennas in Multi-input Multi-output (MIMO) transmissions.

20. The non-transitory computer readable medium according to claim 19 wherein the transmitter is a base station and the receiver is a mobile station in a cellular communication system.

21. The non-transitory computer readable medium according to claim 19, wherein the active eavesdropper interferes in the transmissions, if the ratio or difference value is less than or equal to the threshold value.

* * * * *